United States Patent [19]

Weissmuller

[11] 3,985,316

[45] Oct. 12, 1976

[54] TERMINAL FOR PNEUMATIC CARRIER SYSTEM

[75] Inventor: Adam Weissmuller, Pompton Plains, N.J.

[73] Assignee: The Mosler Safe Company, Hamilton, Ohio

[22] Filed: Apr. 16, 1975

[21] Appl. No.: 568,728

[52] U.S. Cl. .................................... 243/19; 243/2; 243/36
[51] Int. Cl.² ......................................... B65G 51/32
[58] Field of Search ................. 243/19, 20, 23, 24, 243/25, 28, 38, 1, 2, 36

[56] References Cited
UNITED STATES PATENTS

| | | | |
|---|---|---|---|
| 3,610,554 | 10/1971 | Schwarz et al. | 243/19 |
| 3,711,038 | 1/1973 | Van Otteren | 243/19 X |
| 3,790,102 | 2/1974 | Tearne et al. | 243/19 |

*Primary Examiner*—Evon C. Blunk
*Assistant Examiner*—James L. Rowland
*Attorney, Agent, or Firm*—Wood, Herron & Evans

[57] ABSTRACT

A pneumatic air terminal for receiving, presenting, and dispatching pneumatically driven carriers includes a housing, a door selectively opening and closing an opening in the housing, a carrier-receiving cradle, and common drive means for opening and closing the door and for driving the cradle to a carrier presentment position, when the door is opened, and to a retracted position across the terminal from the opening when the door is closed. In an up-receive, down-send terminal, the cradle is completely retracted from the path of an incoming carrier. The carrier is stopped and is held until the cradle moves beneath it and toward the door. In a down-receive, up-send terminal, the cradle is always within the path of, and beneath, an incoming carrier, the carrier coming to rest on the cradle. Each terminal includes an abutment surface for engaging and positioning a carrier in proper position for dispatch as the cradle is driven to a retracted position.

31 Claims, 14 Drawing Figures

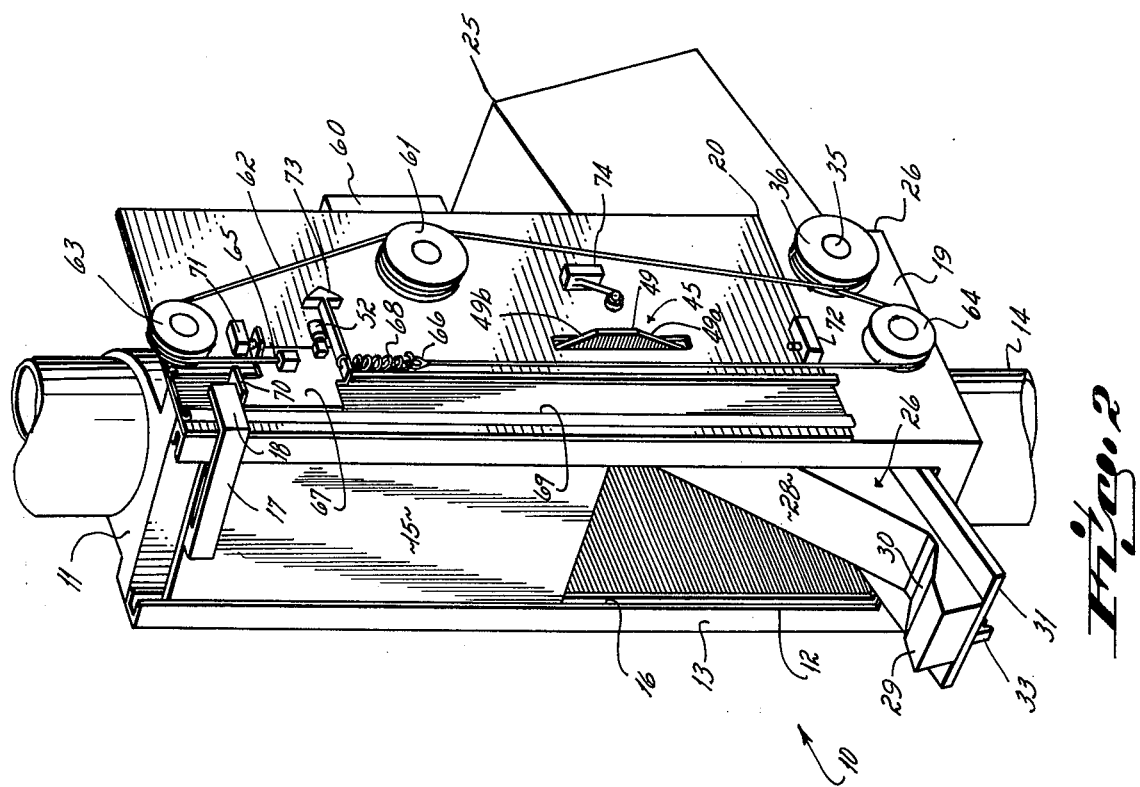
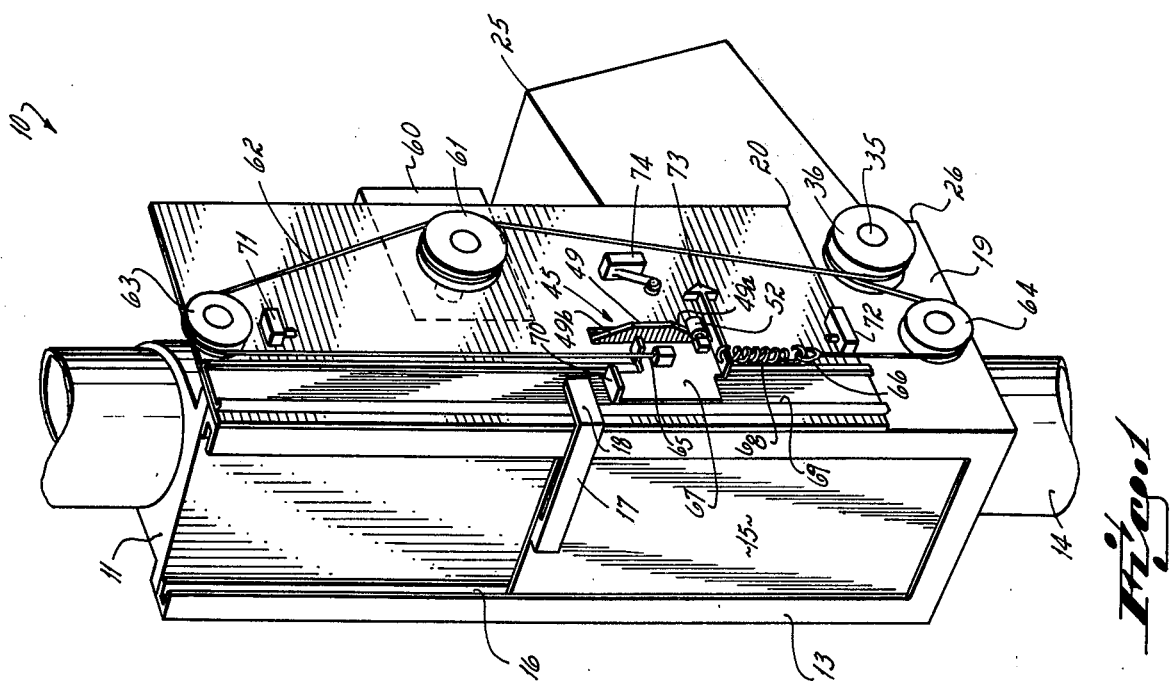

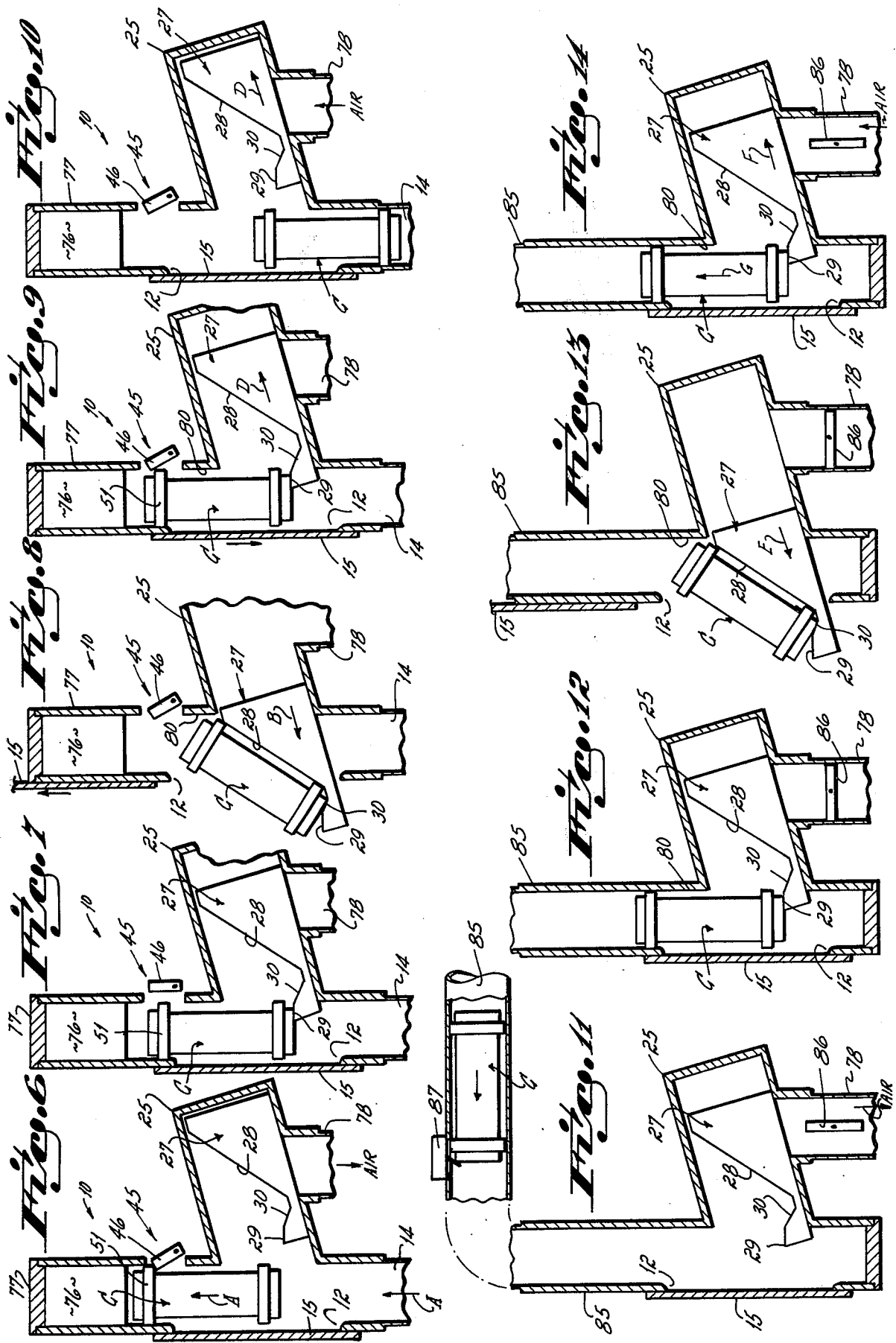

TERMINAL FOR PNEUMATIC CARRIER SYSTEM

This invention relates to terminals for pneumatic carrier systems and particularly to terminal apparatus for receiving, presenting, and dispatching pneumatically driven article carriers.

Pneumatic carrier systems are increasingly being used such as, for example, in banking transactions between a bank customer and a bank teller. The documents of the transaction are carried in a pneumatically driven article carrier traveling in a closed tube between two spaced stations or terminals. Some such systems require two tubes, one for dispatching and one for receiving, which other systems use a single tube for both dispatching and receiving by selectively controlling system pressurization or evacuation. A preferred embodiment of the present invention is particularly related to a terminal utilized in a single tube system, although the invention could be modified for use in a two-tube system.

More particularly, a preferred embodiment of the invention is related to a single tube system utilizing either a terminal of the down-receive, up-send type, wherein carriers are received in a downward direction and are dispatched in an upward direction, or a terminal of the up-receive, down-send type wherein carriers are received in an upward direction and are dispatched downwardly. In either type of terminal, it is desired to receive an incoming carrier, to present it outwardly of the terminal, and to receive a carrier outwardly of the terminal for dispatch from a position within the terminal.

Presentment of an incoming carrier and receipt of a carrier to be dispatched is desired to be accomplished outside of the terminal, or at least in such position so that an operator is not required to place his hands or fingers in a dangerous position within the terminal. Thus, one objective of the invention has been to provide a safe terminal which does not require an operator to introduce his hands or fingers therein for operation.

In another aspect of the invention, it has been desired to simplify the mechanism of the terminals referred to so as to reduce cost and maintenance expense, and as well to simplify operating and maintenance procedures. It has thus been a further objective of the invention to provide a terminal wherein a carrier is retrieved or is positioned for dispatch by a single simple grasping or placement movement, and wherein the terminal mechanisms are easily accessible for any required maintenance.

In a still further aspect of the invention, it has been desired to provide a terminal wherein the terminal mechanisms for sealing, for door opening and closing, for carrier presentment and for carrier dispatch are all coordinated so that proper operation is assured and the changes for jamming or other malfunctions are reduced. It has thus been a further objective of the invention to provide terminal apparatus which cooperates in a uniquely coordinated manner for terminal opening, carrier presentment, carrier receipt, terminal closing and carrier dispatch.

To these ends, the invention contemplates terminal apparatus for either an up-receive, down-send terminal or for a down-receive, up-send terminal. In a preferred embodiment, the invention includes a terminal having an opening, a door for selectively opening and closing the opening, a carrier cradle movable to present a carrier outwardly of the terminal and to position a carrier thereon for dispatch within the terminal, and common drive means for both opening and closing the door and for driving the cradle between a carrier presenting position and a carrier dispatching or retracted position.

In an up-receive, down-send terminal, a carrier latch is provided above the cradle for holding incoming carriers. The common drive means is operated to raise the door, move the cradle under the carrier, and unlatch the carrier so that it falls on the cradle. Continued movement of the drive means completely opens the door and drives the cradle through the opening where the carrier is presented for removal.

For dispatching, a carrier is placed on the extended cradle and the common drive means is actuated to retract the cradle and to close the door. An abutment in the terminal engages the carrier and pivots it to an upright position as the cradle is retracted, but not so far as to engage the latch. When the cradle is completely retracted, it is withdrawn from beneath the carrier and the carrier falls into the tube for transmittal to a remote station.

In a down-receive, up-send terminal, a forward end of the carrier is always in the path of an incoming carrier. No latch is required and the carrier comes to rest on the cradle, after being slowed by an air-cushioning effect obtained by sealing the terminal when the incoming carrier is detected. Carrier presentment and dispatch is thereafter similar to the embodiment above, except that the carrier is transported upwardly upon dispatch, the cradle always remaining beneath the carrier within its incoming path.

The invention thus has the advantages of safety; no placement of hands or fingers within the terminal is required. It also has the advantage of a common drive means for opening and closing the terminal door, for driving the carrier cradle, and for releasing the carrier latch of the up-receive, down-send terminal.

These and other objects and advantages will become readily apparent from the following written description of a preferred embodiment, and from the drawings in which:

FIG. 1 and 2 are perspective views showing a terminal of the invention in an up-receive, down-send configuration;

Figure 3:
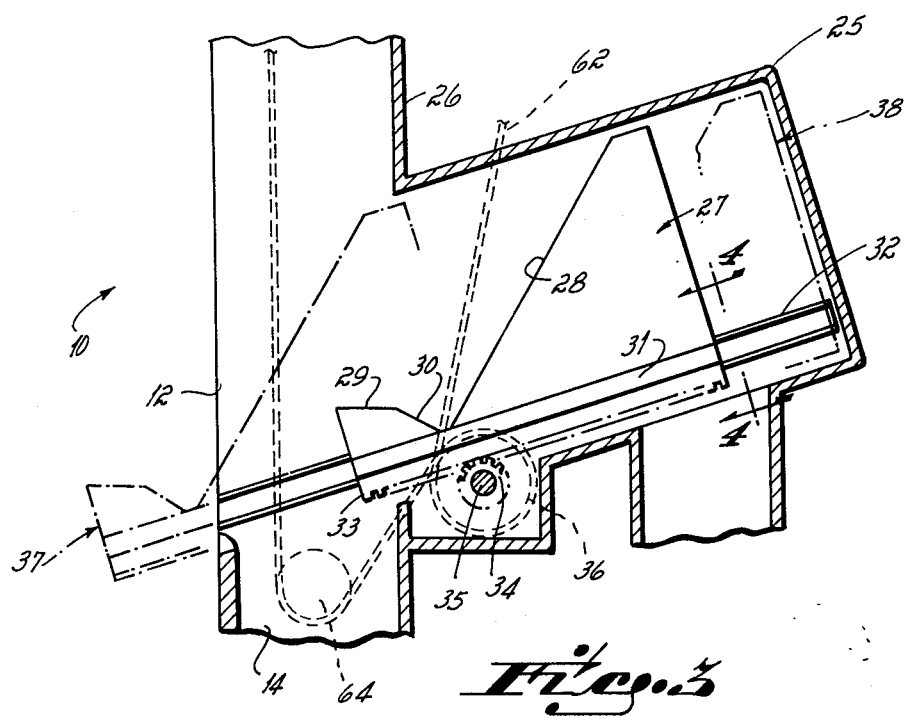
FIG. 3 is a cross-sectional side view of the invention, particularly showing the cradle drive features.

FIGS. 6–10 are modified diagrammatic cross-sectional side views showing various positions of the features of the terminal of FIGS. 1 and 2; the latch, for clarity only, being shown on a rear wall of the terminal, instead of on the side wall as in FIGS. 1 and 2; and FIGS. 11—14 are diagrammatic cross-sectional side views showing various positions of the features of a terminal of the invention in a down-receive, up-send configuration.

Referring now particularly to the drawings as shown in FIGS. 1 and 2 thereof, terminal 10 is a terminal of the up-receive, down-send type. Its structural features, however, except with respect to the carrier latch which will later be described, are similar to those of the terminal of the down-receive, up-send type as also hereinafter described.

More particularly, the terminal includes a terminal housing or fitting 11 and an opening 12 in a front wall 13 of the housing. The specific terminal shown in FIGS. 1 and 2 is particularly adapted for use in a single pneumatic tube system wherein carriers are received in an upward direction through a pneumatic transport tube 14, and wherein carriers are dispatched in a downward direction through the same tube 14.

For selectively opening or closing the opening 12, a slidable door 15 is mounted in channel-like guideways 16, and the door is vertically slidable between a closed position, as shown in FIG. 1, and an open position as shown in FIG. 2. The door 15 includes an extension or abutment portion 17 which is bent at right angles to provide a short abutment portion 18. This abutment is engagable by a movable member for door opening as will later be described.

The terminal 10 also includes an extended housing receptacle 25 which communicates with the terminal at a rearward wall 26 and at a position opposite the opening in the front wall 13. The extended housing 25 provides a housing for a carrier supporting cradle means 27.

The cradle means includes an inclined carrier supporting surface 28 and a forward cradle end having a carrier abutment or stop surface 29. The cradle also includes a carrier abutment surface 30 for supporting the lower end of the carrier when the carrier is inclined along the support surface 28. When a carrier is supported on the surfaces 28 and 30, it lies at an angle between the vertical and the horizontal as shown in the drawings.

Figure 4:
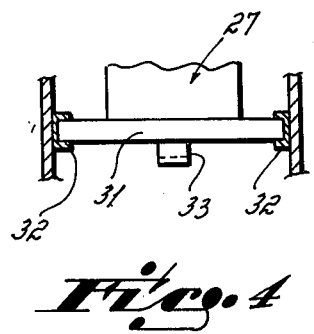
FIG 4 is a cross-sectional view taken along lines 4—4 of FIG. 3.

The cradle is supported on a flat plate 31 and, as particularly shown in FIG. 4, the plate 31 is positioned between inclined channel or track members 32 on either side of the terminal so that the plate is slidable therein. The channels are inclined at an acute angle with respect to the horizontal and are angularly inclned with respect to the vertical path of incoming carriers, such as indicated by the arrows A in FIG. 6.

A rack 33 is attached to the bottom of the plate 31 and a rack-engaging pinion 34 is rotatably mounted in the terminal. The pinion 34 is connected via a rotatable shaft 35 to a pulley 36, so that when the pulley is rotated, the pinion is also rotated to engage the rack and move the cradle between a forward carrier presentment position, as shown by phantom lines 37 in FIG. 3, and a retracted position, such as shown by the phantom lines 38 of FIG. 3. In the retracted position, the forward end of the cradle and the carrier abutment or stop surface 29 are completely withdrawn from the path of an incoming carrier, i.e., that is, the forward end of the cradle in its retracted position is rearward of the rear terminal walls 26, as seen diagramatically in FIG. 6. Of course, in a down-receive, up-send configuration, the retracted position of the cradle 27 is as shown in the solid lines of FIG. 3 as will later be discussed.

Figure 5:
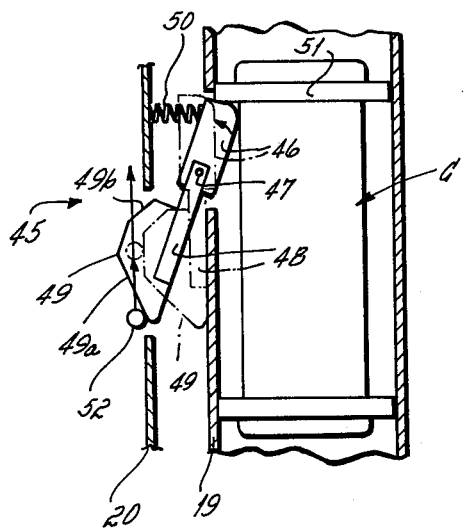
FIG. 5 is a cross-sectional side view of the latch utilized in the terminal of FIGS. 1 and 2.

In the up-receive, down-send terminal as presently described, a latch means 45 is provided on a side wall 19 of the terminal between the forward wall 13 and the rearward wall 26. The latch means is particularly shown in FIG. 5 and includes a latching member 46 which is pivoted to the terminal about a pivot point 47 near or on wall 19. An arm 48 extends below the pivot 47 and a cam member 49 is attached to the lower end of the arm. A spring 50 biases the latch member in a clockwise direction as viewed in FIG. 5 and into the path of the carrier C through an opening in wall 19 so that a carrier can pass the latch member, when the carrier is moving in an upward direction (the latch pivoting in a counterclockwise direction about pivot 47). When, however, the forward sealing ring or gasket 51 of the carrier passes the latch member 46, the spring 50 moves the latch member inwardly toward the carrier, where it engages the underside of the ring 51 and holds the carrier in a vertical position against downward vertical movement.

The cam member 49 includes two cam surfaces, 49a and 49b, which extend through an opening in a mounting plate 20. Surface 49a is engaged by a roller 52 (FIG. 1), for releasing the latch when the door is opened as will be described.

The invention contemplates a common driving means for driving the cradle between its presentment and retracted positions, for opening and closing the door 15 and, in an up-receive, down-send terminal, for operating the latch means 45. The common drive means includes a motor means 60, mounted on the terminal near the mounting plate 20, a drive pulley 61 mounted on the opposite side of plate 20 for rotation by the motor, and a flexible driving means such as flexible cable 62. The cable is disposed about idler pulleys 63 and 64, and is wound about the pulley 36 which is connected to drive the cradle. The cable has two ends, 65 and 66, each of which is connected to a slide member 67. A shock-absorbing spring 68 is disposed between the cable end 66 and the slide member 67, and serves to accommodate slight over travel of the cable 62 when the slide 67 is moved downwardly.

A track means or raceway 69 is provided on the plate 20 and the slide member 67 is mounted thereon for vertical movement. Thus when the motor 60 is actuated, drive pulley 61 is rotated to drive the slide member 67 vertically and, at the same time, to drive pulley 36 so as to rotate the pinion for driving the cradle 27.

Slide member 67 has an abutment surface 70 for engaging the abutment or extension 18 of the door 15. Thus, when the drive pulley 61 is rotated in a clockwise direction, as viewed in FIGS. 1 and 2, the flexible driving member 62 is pulled to raise the slide member 67 upwardly whereupon the abutment 70 engages the abutment 18 and raises the door 15 to an open position. At the same time, the end 66 of the cable is pulled, via its connection with the slide member 67 through the spring 68, and rotates the pulley 36 so as to drive the cradle toward a presentment position.

When the cradle is to be returned to its retracted position, the direction of rotation of the drive pulley 61 is reversed and the slide member is lowered, thereby allowing the door to slide downwardly to close the terminal. At the same time, the pulley 36 is rotated in a clockwise direction to drive the cradle to its retracted position.

As shown in FIGS. 1 and 2, the roller 52 is mounted on the slide member 67 in a position to engage the cam surface 49a to pivot the latch member as the roller follows the movement of the slide 67. This releases the latch, at the same time the door is opened and the cradle is moved forward, so as to drop the carrier on the cradle.

Switches 71 and 72 are connected through appropriate circuitry and act as limit switches to stop the motor when the slide member 67 has reached its respective upper-most or lower-most positions.

As shown in FIG. 1, the slide member 67 is not always in engagement with the door extension 18.

Rather, the slide member is normally located beneath the door extension such as at a lower-most position where it would engage the switch 72. In this manner, the motor can be actuated to drive the cable 62 and thereby again movement of the cradle 27 toward its presentment position before the slide member 67 is in such a position to open the door or to disengage the latch means 45 from a latched carrier. This will become evident from the following description of the operation of the terminal, as diagramatically shown in FIGS. 6 through 10.

The slide member 67 can be provided with an extension 73 which is positioned to engage, in passing, a sensing switch 74 to indicate through appropriate circuitry, the position of the slide member, of a door-opened or door-closed condition of the terminal, or of an unlatched carrier, as required.

Turning now to a description of the operation of the terminal, the operation of the up-receive, down-send terminal is diagramatically shown in FIGS. 6-10. In these figures, the latch is shown for clarity on the rear wall of the terminal. This placement is for descriptive purposes only and it will be appreciated that the actual preferred position of the latch is as shown at FIGS. 1 and 2, at the side of the terminal.

In FIG. 6, an incoming carrier C is introduced into the terminal in the direction of the arrows A. The top of the terminal is provided with a resilient carrier stop or bumper means 76 which is positioned in an upper extension or tube portion 77 of the terminal. The position of the bumper is above that of the latch 46 so that the forward end of the carrier C is allowed to pass the latch 46 prior to engaging the bumper. Once the incoming carrier has passed the latch, the latch rotates to the position shown in FIG. 6 so as to engage the lower side of the carrier's sealing gasket 51 and to thereby latch and hold the stopped carrier in the position shown in FIG. 6.

When it is desired to present the carrier outwardly of the terminal, the motor 60 is actuated, whereupon the drive pulley 61 is operated in a clockwise direction. By virtue of the common drive means of the motor, and the flexible cable 62, the operation of the door, the latch and the cradle are coordinated. At the same time, the slide member 67 is drawn upwardly while the pulley 36 is rotated in a counterclockwise direction (as shown in FIG. 1) so as to drive the cradle 27 from its retracted position, as shown in FIG. 6, to a position beneath the lower end of the carrier C. When the slide member approaches the cam 49, the roller 52 engages the cam to pivot the latch from beneath the upper sealing gasket 51 of the carrier, thereby allowing the carrier to fall on the carrier abutment or stop surface 29 at the forward end of the cradle. Thus, the carrier is not unlatched until the cradle is moved beneath it. Also during upward movement of the slide member 67, its abutment 70 engages the door extension 18 and raises the door.

Continued rotation of the drive pulley 61 moves the cradle 27 forwardly in the direction of arrow B to present the carrier thereon in a position as shown in FIG. 8, the door having been completely raised by the slide member 67 to an open position as shown in FIGS. 2 and 8. In this position, the carrier can be easily grasped by an operator and removed from the terminal without the operator having to insert his fingers or hand into the terminal.

When the carrier has been emptied or filled as appropriate, it can be positioned for dispatch by further coordinated movement of the elements of the terminal. The carrier is first placed on the cradle as shown in FIG. 8 and the motor 60 is actuated to rotate the drive pulley 61 in a counterclockwise direction (as viewed in FIG. 1). This motion immediately rotates the pulley 36, and the pinion 34, in a clockwise direction to drive the cradle toward its retracted position and in a direction as shown by the arrow D in FIG. 9. As the cradle moves toward its retracted position, the upper end of the carrier C engages an abutment 80 within the terminal. Continued rearward movement of the cradle pushes the carrier upwardly into the terminal, by virtue of the carrier engagement with the cradle surfaces 29 and 30, so that the carrier C is disposed in the vertical position shown in FIG. 9. In that position, the upper end of the carrier, however, has not been raised so high so as to engage the latch 46, and the carrier is simply held within the terminal by virtue of its engagement with the carrier stop surface 29 of the cradle 27. At the same time, of course, movement of the pulley 61 has drawn the flexible cable 62 to pull the slide member 67 downwardly, thereby allowing the door to return to its closed position as shown in FIG. 1.

When the cradle 27 is moved to its fully retracted position, as shown in FIG. 10, it is completely removed from the path of the carrier and the carrier is dropped into tube 14 for dispatch to a remote station. During this operation, of course, the terminal can be pressurized via a conduit 78 (which communicates with the terminal through the extended housing 25), in order to aid in driving the carrier.

From this description, it can thus be seen that the movement of the cradle, the door, and the latch are all coordinated for both receiving and presentment operations, as well as for carrier insertion and dispatching operations. Neither presentment nor dispatch requires an operator to extend his hand or fingers into the terminal, and operation of the various features is simplified by a common drive means which drives the carrier supporting cradle and terminal door at the same time.

In an alternate embodiment, the invention contemplates a terminal in a down-receive, up-send configuration. This terminal is diagramatically shown in FIGS. 11 through 14, and the details of the terminal are similar to the terminal shown in FIGS. 1 through 4 of the drawings, with the exception that a pneumatic transport tube 85 is connected to deliver a carrier in a vertically downward direction to the terminal.

In this terminal, the conduit 78 is provided with a pivoted wind gate 86 for closing the conduit and thereby sealing the terminal. The wind gate 86 is used for bringing the carrier to a gentle stop on the forward end of the cradle. Specifically, a carrier detecting switch 87 is positioned upstream in the transport tube 85 and detects the passage of the incoming carrier. Upon operation of the switch, and in response thereto, appropriate drive means are signalled to close the wind gate 86 and to thereby seal the terminal as the carrier enters it. The carrier thus tends to compress the air in the terminal and this compression "cushions" the carrier so that its lower end comes to rest softly on the carrier stop surface 29 of the cradle 27. As shown in the solid lines of FIG. 3, and in FIGS. 11, 12 and 14, the fully retracted position of the cradle 27 in this embodiment is such that the abutment surface 29 is always within the path of an incoming carrier C.

When the carrier C is stopped by the cradle 27, the motor 60 is actuated to rotate the pulley 61 in a clockwise direction (see FIG. 1). This drives the pulley 36 and the pinion 34 in a counterclockwise direction and thus moves the cradle fowardly, in the direction of the arrow E, as shown in FIG. 13. At the same time, the slide member 67 is raised by the flexible cable 62 so that the abutment 70 engages the door extension 18 and raises the door to an open position as also shown in FIG. 13. The carrier is thus presented through the opening 12 outwardly of the terminal where it can be removed from the cradle 27.

When the carrier is to be dispatched, it is simply placed on the cradle 27, in the position shown in FIG. 13, and the motor 60 is actuated to drive the cradle to its retracted position in a rearward direction as shown by the arrow F in FIG. 14. When the cradle is moved rearwardly, the upper end of the carrier C engages an abutment surface 80 within the terminal and the carrier, by virtue of its engagement with the surfaces 29 and 30 on the foward end of the cradle, is moved upwardly into the tube 85. By this movement, the upper sealing gasket of the carrier C is positioned in sealing engagement with the tube 85 as shown in FIG. 14. When the cradle has reached its retracted position and when the door 15 has been simultaneously closed, the wind gate 86 is opened. Pressurized air is introduced into the terminal through the conduit 78 to pressurize the terminal and propel the carrier C upwardly in the direction of arrow G for dispatch to a remote station.

It can thus be appreciated in this embodiment that no latch is required. The other functions of the terminal, however, are similar in that the movements of the door and the cradle are coordinated by a common drive means, and in that the carrier is presented through the opening 12 outwardly of the terminal so that the operator need not extend his hands or fingers into the terminal for operation thereof.

Each of the embodiments described above has depicted the terminal for use in the single tube system whereby carriers are both transmitted and dispatched via a single tube connected to the terminal. In each embodiment, the carrier is delivered or introduced into a central area of the terminal between the opening 12 in a front wall of the terminal, and a rearward opposite wall through which the cradle is retracted. The embodiments differ in that the up-receive, down-send terminal requires a latch as shown in FIGS. 6 through 10. Further, the fully retracted position of the cradle 27 is designed so that in the up-receive, down-send terminal, the cradle is completely out of the path of an incoming carrier. On the other hand, in the down-receive, upsend terminal the forward end of the cradle, even when the cradle is in its retracted position, is always located in the path of an incoming carrier and provides a carrier stop.

Even though these embodiments contemplate the utilization of the terminals as described with respect to a single transport tube system wherein carriers are both received and dispatched via a single tube, the structure thus disclosed could be modified, without departing from the scope of the invention, for use with a twin or double tube system.

These and other modifications and alterations will become readily apparent to one of ordinary skill in the art, without departing from the scope of the invention, and applicant intends to be bound only by the following claims:

I claim:

1. A pneumatic transport terminal adapted for the receipt and dispatch of article carriers from and to a single pneumatic transport tube, said terminal including:
   an opening in one side of the terminal;
   a door for selectively opening and closing said opening;
   a carrier-supporting cradle means movable mounted within the terminal, said cradle movable along a path between a retracted position adjacent a side of the terminal opposite the door, and a presentment position across the terminal wherein the cradle means extends at least partially through the opening, said tube connected to said terminal so as to present an incoming carrier along a carrier path within said terminal in a central area thereof between said opening and said opposite side;
   common drive means for opening and closing the door and for driving the cradle means for said retracted position to said presentment position, when the door is opened, and from said presentment position to said retracted position when the door is closed; and
   a rack connected to said cradle means, a rotatable pinion drivingly engaging said rack, and a flexible driving member connected to rotate said pinion and to open and close said door.

2. Apparatus as in claim 1 wherein said terminal is an up-receive, down-send terminal, said cradle means in said retracted position being located outside the path of an incoming carrier.

3. Apparatus as in claim 2 including latch means for holding an incoming carrier, and means to release said latch means when said door is opened, said cradle means being movable beneath said carrier to catch it and present it through said opening when the door is opened and said latch is released.

4. Apparatus as in claim 1 wherein said terminal is a down-receive, up-send terminal, said cradle means in said retracted position being within the path of an incoming carrier.

5. Apparatus as in claim 1 wherein the path of said cradle means is inclined with respect to the horizontal, and wherein said carrier path is substantially vertical.

6. Apparatus as in claim 5 wherein said cradle means includes a surface for supporting carriers at an angle between the vertical and the horizontal.

7. A pneumatic up-receive, down-send transport terminal adapted for the upward receipt and downward dispatch of article carriers from and to a single pneumatic transport tube, said terminal including:
   a terminal housing;
   an opening in one side of said housing;
   a door means for selectively closing and opening said opening;
   a carrier supporting cradle means movably mounted within the housing, said cradle means movable along a path defining a straight line between a retracted position adjacent a side of the housing opposite the opening, and a presentment position across the housing wherein the cradle means extends at least partially through the opening, said housing adapted for receiving a carrier in an area between said door and said opposite side;
   common drive means for opening and closing the door and for simultaneously driving the cradle means respectively to said presentment position when the door is opened and to said retracted position when the door is closed, and said tube connected to said housing to introduce and to receive carriers along a carrier path in a central area of said housing between said door and said opposite side.

8. Apparatus as in claim 7 including an extended housing receptacle for said cradle means when said cradle means is in a retracted position, said receptacle communicating with said terminal housing at a side thereof opposite said opening.

9. Apparatus as in claim 7 wherein said cradle means is movable to a retracted position out of the path of an incoming carrier.

10. Apparatus as in claim 9 wherein said tube is connected to introduce an incoming carrier into said housing at a bottom area thereof, and further including a carrier stop means above said bottom area, a carrier latch means disposed for latching and holding said incoming carrier within said terminal in a position above the path traversed by said cradle means.

11. Apparatus as in claim 10 wherein said cradle means is moved along said path under a carrier held by said latch means when said door is opened.

12. Apparatus as in claim 11 wherein said common drive means includes means to release said latch, when said door is opened, to permit said carrier to drop onto said cradle means for presentment toward said door.

13. Apparatus as in claim 10 including abutment means in said terminal for engaging and positioning a cradle-carried carrier substantially vertically therein when said cradle is moved from its presentment position to its retracted position.

14. Apparatus as in claim 13 wherein said latch is disposed at a position above said carrier when said carrier is vertically disposed, said latch means remaining inoperative to latch and hold said vertically positioned carrier.

15. Apparatus as in claim 14 wherein said cradle means is movable from beneath said vertically disposed carrier to a cradle retracted position to permit said carrier to fall into said tube for dispatch.

16. Apparatus as in claim 10 wherein said latch means is pivoted to said housing and is spring biased toward a carrier latching position;
said latch means further including an arm extending outwardly of said housing; and
said common drive means including means for engaging said arm to pivot said latch means and to thereby release a latched carrier when said door is opened and said cradle means is moved toward its presentment position and beneath a latched carrier.

17. A pneumatic down-receive, up-send transport terminal adapted for the downward receipt and upward dispatch of article carriers from and to a single pneumatic transport tube, said terminal including:
a terminal housing;
an opening in one side of said housing;
a door means for selectively closing and opening said opening;
a carrier supporting cradle means movably mounted within the housing, said cradle means movable along a path defining a straight line between a retracted position adjacent a side of the housing opposite the opening, and a presentment position across the housing wherein the cradle means extends at least partially through the opening, said housing adapted for receiving a carrier in an area between said door and said opposite side;
common drive means for opening and closing the door and for simultaneously driving the cradle means respectively to said presentment position when the door is opened and to said retracted position when the door is closed;
said transport tube connected to said housing to introduce and to receive carriers along a carrier path in a central area of said housing between said door and said opposite side; and
wherein said cradle means, in a retracted position includes a carrier stop means remaining in the path of an incoming carrier for stopping said incoming carrier thereon.

18. Apparatus as in claim 17 including means to seal said terminal for providing an air cushion to slow said incoming carrier.

19. Apparatus as in claim 18 including sensing means upstream in said pneumatic transport tube for sensing the passage of a carrier to be received and for signaling said sealing means to seal said terminal to cushion said incoming carrier.

20. Apparatus as in claim 17 wherein said cradle means is movable to the presentment position to present a received carrier through said opening.

21. Apparatus as in claim 17 wherein said cradle means is movable from its presentment position to its retracted position to position a carrier thereon for dispatch.

22. Apparatus as in claim 21 including abutment means in said terminal for engaging said carrier and positioning said carrier in alignment with said pneumatic transport tube when said cradle means is moved to its retracted position.

23. A pneumatic transport terminal adapted for the receipt and dispatch of article carriers, said terminal including:
a terminal housing;
an opening in one side of said housing;
a slidable door means for selectively closing and opening said opening, said door means including a door actuating abutment extending therefrom;
a carrier supporting cradle means movably mounted within the housing, said cradle means movable along a path between a retracted position adjacent a side of the housing opposite the opening, and a presentment position across the housing wherein the cradle means extends at least partially through the opening, said housing adapted for receiving a carrier in an area between said door and said opposite side;
common drive means, including a flexible driving member operably connected to drive said door and said cradle means, for opening and closing the door and for simultaneously driving the cradle means respectively to said presentment position when the door is opened and to said retracted position when the door is closed;
a track means on said housing;
a slide member slidably mounted on said track means, and
a door-driving abutment surface on said slide means for engaging said abutment on said door to open said door, said flexible driving means connected to move said slide member along said track means for operating said door.

24. Apparatus as in claim 23 wherein said terminal is an up-receive, down-send terminal and further including:
- latch means within said terminal for latching and holding incoming carriers; and
- means on said slide member for controlling said latch means to disengage said latch means from said incoming carrier and to permit said carrier to fall into said cradle means when said slide member is moved along said track.

25. Apparatus as in claim 23 wherein said track means and said slide member are disposed on a side of said housing between the housing opening side and the opposite side of the terminal.

26. A pneumatic transport terminal adapted for the receipt and dispatch of article carriers from and to a single pneumatic transport tube, said terminal including:
- a terminal housing;
- an opening in one side of said housing;
- a door means for selectively closing and opening said opening;
- a carrier supporting cradle means slidably mounted within the housing, said cradle means movable along a path between a retracted position adjacent a side of the housing opposite the opening, and a presentment position across the housing wherein the cradle means extends at least partially through the opening, said housing adapted for receiving a carrier in an area between said door and said opposite side;
- a rack on said cradle means;
- a rotatable pinion mounted to engage and drive said rack and said cradle means;
- common drive means for opening and closing the door and operably connected to said pinion for simultaneously driving the cradle means respectively to said presentment position when the door is opened and to said retracted position when the door is closed; and
- said transport tube connected to said housing to introduce and to receive carriers along a carrier path in a central area of said housing between said door and said opposite side.

27. Apparatus as in claim 26 wherein said common drive means includes a flexible driving member connected to rotate said pinion and connected to means for moving said door.

28. Apparatus as in claim 27 wherein said means for moving said door includes a track means and a slide member slidably mounted on said track member, said flexible driving member having two ends, each connected to respective ends of said slide member, and an abutment surface on said slide member for engaging a portion of said door to move said door.

29. Apparatus as in claim 26 wherein said door is slidable in a vertical direction, and includes an extension portion positioned for engagement by a portion of said common drive means to lift said door to uncover said opening.

30. A pneumatic up-receive, down-send transport terminal adapted for the receipt and dispatch of article carriers, said terminal including:
- a terminal housing;
- an opening in one side of said housing;
- a door means for selectively closing and opening said opening;
- a carrier supported cradle means movably mounted within the housing, said cradle means movable along a path between a retracted position adjacent a side of the housing opposite the opening and completely disposed on one side of and outwardly of a path traversed by a carrier coming into said housing, and a presentment position across the housing wherein the cradle means extends at least partially through the opening, said housing adapted for receiving a carrier along a path in an area between said door and said opposite side; and
- common drive means for opening and closing the door and for simultaneously driving the cradle means respectively to said presentment position when the door is opened and to said retracted position when the door is closed.

31. A pneumatic down-receive, up-send transport terminal adapted for the receipt and dispatch of article carriers, said terminal including:
- a terminal housing;
- an opening in one side of said housing;
- a door means for selectively closing and opening said opening;
- a carrier supporting cradle means movably mounted within the housing, said cradle means movable along a path between a retracted position adjacent a side of the housing opposite the opening, and a presentment position across the housing wherein the cradle means extends at least partially through the opening, said housing adapted for receiving a carrier along a path in an area between said door and said opposite side and said cradle means further including carrier stop means thereon and disposed in the path of an incoming carrier, when said cradle means is in a retracted position, for stopping said incoming carrier; and
- common drive means for opening and closing the drive and for simultaneously driving the cradle means respectively to said presentment position when the door is opened and to said retracted position when the door is closed.

* * * * *

UNITED STATES PATENT AND TRADEMARK OFFICE
CERTIFICATE OF CORRECTION

PATENT NO. : 3,985,316
DATED : October 12, 1976
INVENTOR(S) : Adam Weissmuller

It is certified that error appears in the above-identified patent and that said Letters Patent are hereby corrected as shown below:

Column 2, line 24, "carrier" should be --cradle--.

Column 5, line 5, "again" should be --begin--.

Column 7, line 40, "whereby" should be --wherein--.

Column 8, line 8, Claim 1, "movable" should be --movably--.

Column 8, line 19, Claim 1, the second "for" should be --from--.

Column 12, line 51, "drive" should be --door--.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*